April 10, 1934.  A. BISAILLON  1,953,919
COLLAR BUTTON
Filed April 18, 1933
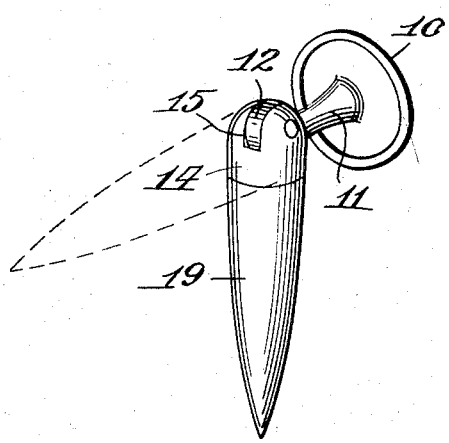
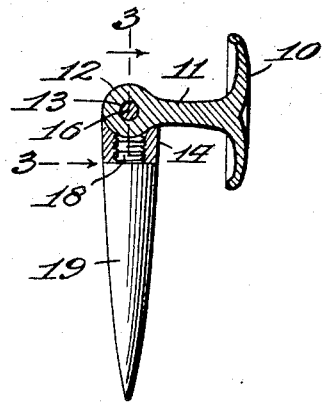
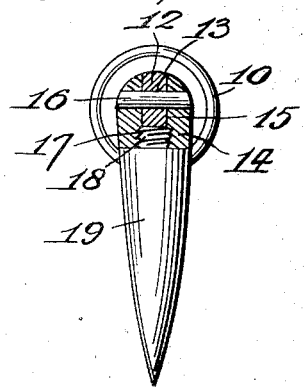
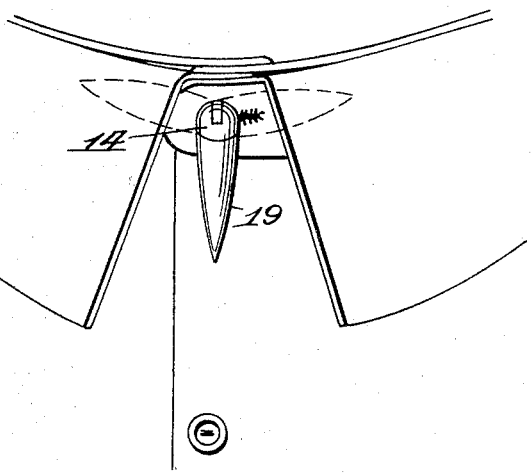
INVENTOR,
ALEXIS BISAILLON.
BY Martin P. Smith ATTY.

Patented Apr. 10, 1934

1,953,919

UNITED STATES PATENT OFFICE 1,953,919

COLLAR BUTTON

Alexis Bisaillon, Los Angeles, Calif.

Application April 18, 1933, Serial No. 666,694

2 Claims. (Cl. 24—97)

My invention relates generally to collar buttons and more particularly to a collar button having a pivoted prong or shank whereby the button proper may be easily and conveniently laced or inserted through the buttonholes in the collar bands and shirts and through the buttonholes of the tabs of collars.

The principal objects of my invention are, to generally improve upon and simplify the construction of collar button applying devices and to provide a collar button lacing prong or shank that is pivotally connected to the head of the button and which prong or shank may be retained upon the head of the button or readily detached therefrom.

A further object of my invention is, to pivotally connect the lacing shank or prong to the head of the button so that said shank or prong may be readily swung to either side so as to occupy an out-of-the-way position between the overlying portion of the collar and the band thereof without offering inconvenience or affecting the proper position and appearance of the knotted portion of the tie which ordinarily overlies the collar button and the tabs of the collar.

With the foregoing and other objects in view my invention consists in certain novel features of construction and arrangements of parts that will be hereinafter more fully described and claimed and illustrated in the accompanying drawing in which:

Fig. 1 is a perspective view of a collar button and lacing shank of my improved construction.

Fig. 2 is a vertical section taken through the center of the collar button and showing the lacing shank or prong in elevation.

Fig. 3 is a vertical section taken on the line 3—3 of Fig. 2.

Fig. 4 is an elevational view of the front portion of a collar with the tabs thereof attached to the shirt and to each other by my improved collar button and lacing shank.

Referring by numerals to the accompanying drawing which illustrates a preferred embodiment of my invention, 10 designates the disc-shaped portion of the collar button and projecting at right angles from the center of said base is a shank 11.

Formed integral with the forward end of shank 11, is a small disc 12 that occupies a plane at right angles to the plane occupied by the base 10 and formed through the center of said disc 12 is an aperture 13.

A head 14, preferably formed of metal, is provided in its upper portion with a slot 15 for the reception of the disc 12 and said head and disc are pivotally connected to each other by a pin or rivet 16 that passes through the head to the sides of the slot therein and through the aperture 13 in disc 12.

Formed in the lower portion of head 14, is a short threaded aperture 17 that is adapted to receive a short threaded stud 18 and the latter being formed integral with one end of a lacing prong or shank 19. The end of this prong or shank 19 has the same size and shape as the end of the head 14 to which said shank is detachably connected and from this end of said shank the body of the latter gradually tapers to a point at the opposite end.

For collar buttons of conventional size, the lacing shank 19 should be from three-quarters of an inch to an inch or an inch and a half in length.

In applying my improved collar button for the purpose of securing the collar in proper position upon the shirt band, the pointed end of the lacing shank 19 is inserted from the rear to the buttonholes in the collar band of the shirt and then through the buttonholes in the overlying tabs of the collar and by engaging and pulling the projecting forward portion of the shank forwardly, the head of the button would be readily drawn through the buttonholes so that the head of the button and the lacing shank occupy positions in front of the front one of the collar tabs, as illustrated in Fig. 4.

After the collar button has been thus applied for use, the lacing shank 19 may be unscrewed from the head 14 or it may be retained by said head and permitted to hang downwardly from the head as shown by solid lines in Fig. 4 or swung upwardly to either side so as to occupy an out-of-the-way position between the overlying portions of the collar and the band thereof, as shown by dotted lines in Fig. 4.

Even though the lacing shank is retained upon the head of the collar button, it offers no inconvenience to that portion of the tie that is formed into a knot and when the tie is properly knotted and the knotted portion is positioned between the forward ends of the collar, the head of the button and the lacing shank will be entirely hid from view by the overlying knot.

Thus it will be seen that I have provided a collar button and lacing device therefor that is relatively simple in construction, inexpensive of manufacture and very effective in performing the functions for which it is intended.

It will be understood that minor changes in the size, form and construction of the various parts of my improved collar button may be made and substituted for those herein shown and described without departing from the spirit of the invention, the scope of which is set forth in the appended claims.

I claim as my invention:

1. The combination with a collar button and its shank, of a head pivotally connected to the forward end of said shank and a lacing prong detachably connected to said head.

2. A shirt collar retaining device, comprising a disc-shaped body, a shank projecting from the center of said body, a head pivotally connected to the forward end of said shank and a lacing prong detachably carried by said head.

ALEXIS BISAILLON.